F. WUERDEMANN.
BUCKET.
APPLICATION FILED MAY 7, 1918.
1,278,281. Patented Sept. 10, 1918.
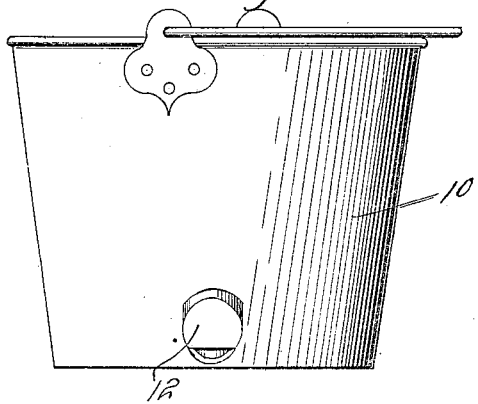
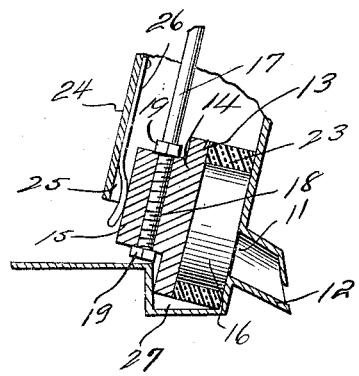
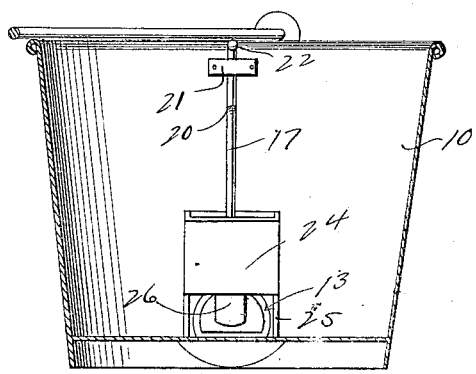
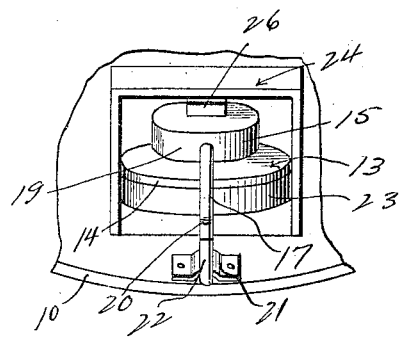
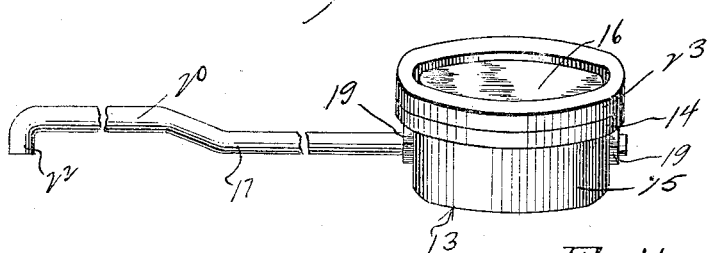
Inventor
F. Wuerdemann.

UNITED STATES PATENT OFFICE.

FREDERICK WUERDEMANN, OF NEW ORLEANS, LOUISIANA.

BUCKET.

1,278,281.

Specification of Letters Patent.   Patented Sept. 10, 1918.

Application filed May 7, 1918.   Serial No. 233,041.

*To all whom it may concern:*

Be it known that I, FREDERICK WUERDE-MANN, a citizen of the United States, residing at New Orleans, in the parish of Orleans, State of Louisiana, have invented certain new and useful Improvements in Buckets; and I do hereby declare the following to be a full, clear, and exact description of the invention, such as will enable others skilled in the art to which it appertains to make and use the same.

This invention is an improvement in receptacles and has particular reference to a valve construction therefor.

An object of the invention is to provide an improved valve for buckets and other like receptacles which will permit of the contents thereof being emptied without tilting the receptacle and which will thereby facilitate the filling of other receptacles without the danger of spilling the contents.

Another object is to provide a bucket or receptacle of this character which is simple in construction, easy to manufacture and effective in carrying out the purpose for which it is designed.

The inventive idea involved is capable of receiving a variety of mechanical expressions one of which, for the purpose of illustrating the inventon, is shown in the accompanying drawing wherein:

Figure 1 is a side elevation of a bucket constructed in accordance with the invention.

Fig. 2 is a top plan view thereof.

Fig. 3 is a fragmentary vertical section on the line 3—3 of Fig. 1.

Fig. 4 is a section on the line 4—4 of Fig. 2.

Fig. 5 is a detailed perspective view of the valve employed in connection with the invention.

Referring more particularly to the accompanying drawing, the numeral 10 indicates a bucket which may be of any desired construction and which is provided in the side wall thereof adjacent its bottom with an outlet opening 11 from which extends the spout 12 through which the contents of the bucket are discharged when the valve, presently to be described, is opened to permit of the flow of said contents through the opening 11. By providing an outlet spout at the bottom of the receptacle it will be apparent that the contents thereof may be emptied without tilting the bucket and that the flow of said contents will be confined by the limits of the spout so as to enable other receptacles to be filled with the contents of the bucket without danger of spilling the same.

The opening 11 in the side wall of the bucket is controlled by a valve construction a prefered form of which is shown in the accompanying drawing and which comprises a valve body 13 including a central enlarged portion 14 of circular formation from the sides of which project the reduced extensions 15 and 16 both of which are concentrically disposed with respect to the periphery of said central portion. The valve body is provided with a stem 17 preferably in the form of a rod having one end screw threaded as indicated at 18 to engage and project through the extension 15 and said stem is secured in its position by means of the nuts 19. Intermediate the ends of the stem 17 the same is preferably bent to provide an offset portion 20 which engages the inner wall of the bucket and which extends through a guide 21 secured to the wall adjacent its upper end. The upper end of the stem 17 is bent to provide a handle 22 which may be grasped to raise and lower the valve in order to open and close the opening 11. In order that leakage from the opening 11 will be prevented when the valve is in closing position, the extension 16 of the valve body has mounted thereon a washer or gasket 23 made of rubber or any other suitable material and of a diameter substantially equal to that of the central portion 14 of the valve body and it will be apparent that when the valve is in closing position, the gasket 23 will surround the opening 11 and thus effectively prevent the contents of the bucket flowing therethrough.

The valve is preferably mounted for vertical sliding movement in a housing 24 of rectangular formation in cross section and having an open top and bottom and the sides and rear wall of the housing are reduced at the bottoms thereof as indicated at 25. The upper edge of the rear wall of the housing has secured to the inner surface thereof one end of a leaf spring 26 the free lower end of which is adapted to engage the extension 15 of the valve body in order to force said valve forwardly and into engagement with the front wall of the housing so that the gasket or washer 23 will have frictional engagement with said front wall when the valve is in its closing position and in this manner the utility of the valve will be made more effective. In order that the discharge opening 11 may be disposed as near the bottom of the bucket as possible, said bottom is provided therein with a depression or recess 27 of arcuate formation adapted to receive the lower portion of the valve when the same is in closing position.

What is claimed is:—

1. A receptacle having a discharge opening adjacent the bottom thereof, a housing secured within and to the side of said receptacle adjacent the opening, a valve slidable vertically in said housing for opening and closing said discharge opening, a spring secured to said housing and engaging said valve to frictionally retain the same in its closing position, and a stem for said valve projecting upwardly therefrom and having a handle at its upper end for adjusting said valve to open and close said discharge opening.

2. A bucket having a discharge opening adjacent the bottom thereof and also having a depression in its bottom adjacent said discharge opening, a housing secured to said receptacle and having an open top and bottom, a valve slidable vertically in said housing and including a central portion having reduced extensions projecting from both sides thereof, a gasket mounted upon one of said extensions and adapted to surround said discharge opening when the valve is in closing position to prevent leakage of the contents of the receptacle, a leaf spring having one end secured to the housing and its other end engaged with the other of said extensions to frictionally maintain the valve in its closing position, a valve stem having one end secured in the last named extension and having an offset portion at the other end thereof adapted for engagement with the side of a receptacle, and a guide secured to said side of the receptacle and through which said portion is vertically movable.

In testimony whereof, I affix my signature, in the presence of two witnesses.

FREDERICK WUERDEMANN.

Witnesses:
A. M. MUNSON,
S. A. BECK.

Copies of this patent may be obtained for five cents each, by addressing the "Commissioner of Patents. Washington, D. C."